US012701609B2

(12) United States Patent
Smith et al.

(10) Patent No.: US 12,701,609 B2
(45) Date of Patent: Aug. 4, 2026

(54) BASIC SERVICE SET RESOURCE RESERVATION

(71) Applicant: Cisco Technology, Inc., San Jose, CA (US)

(72) Inventors: Malcolm M. Smith, Richardson, TX (US); Brian D. Hart, Sunnyvale, CA (US); Sanjay Katabathuni, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 18/494,822

(22) Filed: Oct. 26, 2023

(65) Prior Publication Data

US 2025/0142615 A1 May 1, 2025

(51) Int. Cl.
| | |
|---|---|
| *H04W 74/04* | (2009.01) |
| *H04W 28/26* | (2009.01) |
| *H04W 72/1263* | (2023.01) |
| *H04W 72/27* | (2023.01) |
| *H04W 74/00* | (2009.01) |

(52) U.S. Cl.
CPC ........... *H04W 74/04* (2013.01); *H04W 28/26* (2013.01); *H04W 72/1263* (2013.01); *H04W 72/27* (2023.01); *H04W 74/002* (2013.01)

(58) Field of Classification Search
None
See application file for complete search history.

(56) References Cited

U.S. PATENT DOCUMENTS

| | | | | |
|---|---|---|---|---|
| 9,667,394 | B2 * | 5/2017 | Lee | H04W 72/121 |
| 9,668,243 | B1 * | 5/2017 | Gong | H04W 74/0825 |
| 9,706,529 | B2 * | 7/2017 | Seok | H04W 74/0816 |
| 10,004,031 | B2 * | 6/2018 | Seok | H04W 72/0453 |
| 11,696,345 | B2 * | 7/2023 | Xue | H04W 74/0883 370/329 |
| 11,711,848 | B2 * | 7/2023 | Ghosh | H04W 74/0816 370/329 |
| 2013/0051256 | A1 | 2/2013 | Ong et al. | |
| 2017/0104563 | A1 * | 4/2017 | Lee | H04W 72/121 |
| 2021/0028833 | A1 | 1/2021 | Seok | |
| 2021/0410163 | A1 | 12/2021 | Xia et al. | |
| 2022/0174732 | A1 | 6/2022 | Xia et al. | |
| 2022/0264566 | A1 | 8/2022 | Chu et al. | |
| 2022/0279601 | A1 * | 9/2022 | Xue | H04W 74/0816 |
| 2022/0286947 | A1 | 9/2022 | Cavalcanti et al. | |
| 2023/0026790 | A1 | 1/2023 | Gordaychik | |

OTHER PUBLICATIONS

International Search Report and Written Opinion for International Application No. PCT/US2024/052595, mailed Jan. 21, 2025, 19 Pages.

* cited by examiner

*Primary Examiner* — Eunsook Choi
(74) *Attorney, Agent, or Firm* — Merchant & Gould P.C.

(57) ABSTRACT

Basic Service Set (BSS) resource reservation may be provided. BSS resource reservation may include determining a time window for a to accommodate a transmission of a target Station (STA) in a BSS, wherein the BSS further comprises one or more other STAs. An AP may then transmit a reservation scheduling frame, to claim access of a channel, inform the target STA of the time window, and reserve the channel for a duration defined by the time window.

20 Claims, 4 Drawing Sheets

300

100

300

BASIC SERVICE SET RESOURCE RESERVATION

TECHNICAL FIELD

The present disclosure relates generally to providing Basic Service Set (BSS) resource reservation.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
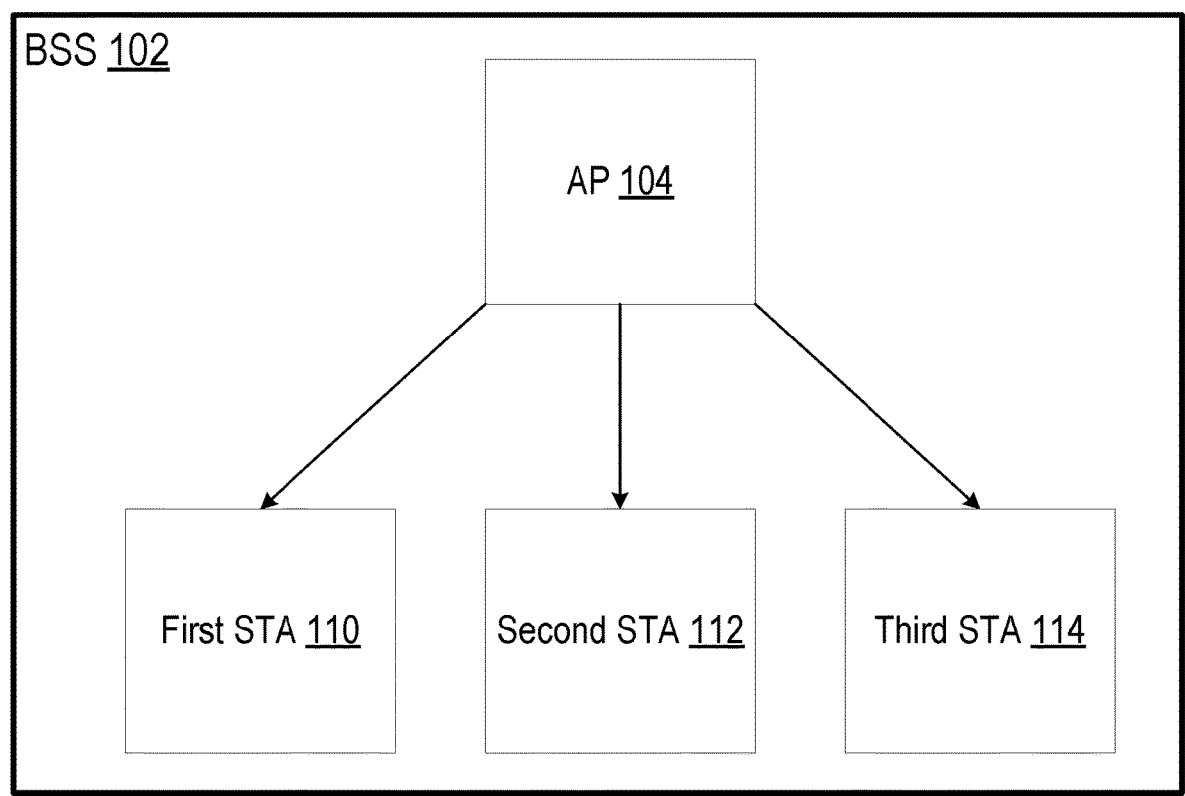
FIG. 1 is a block diagram of an operating environment for Basic Service Set (BSS) reservations.

Basic Service Set (BSS) resource reservation may be provided. BSS resource reservation may include determining a time window for a to accommodate a transmission of a target Station (STA) in a BSS, wherein the BSS further comprises one or more other STAs. An AP may then transmit a reservation scheduling frame, to claim access of a channel, inform the target STA of the time window, and reserve the channel for a duration defined by the time window.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Restricted Target Wake Time (r-TWT), as defined in the Institute of Electrical and Electronics Engineers (IEEE) 802.11 standard (e.g., 802.11ah, IEEE 802.11ax), may enable the explicit reservation of time-slots for Stations (STAs), such as STAs with low power requirements. For example, r-TWT may enable an Access Point (AP) to allocate access to the network at specified times, and STAs may be able to request r-TWT time slots to access the network. Implementing r-TWT may include orchestrating Quiet Elements (QEs) and Target Wake Time (TWT) periods. QEs may inform STAs to not transmit at a certain time after a beacon (e.g. for 100 milliseconds after a beacon), and the TWT may include a Transmit Opportunity (TxOp) for a single STA in that same period. Thus, r-TWT may enable STAs to implement power-saving mechanisms including sleeping between AP beacons and waking up to transmit data during a TxOp during a TWT period.

Current r-TWT implementations may have significant limitations as applied to Time-Sensitive Networking (TSN) with gate constructs (e.g., as described by IEEE 802.1Qbv) because a QE may have about one millisecond (e.g., 1,024 microseconds) of minimum granularity. The granularity of the QE may be too large or otherwise waste too much time for TSN traffic. Additionally, this may limit the number of devices that can be supported when utilizing r-TWT (e.g., because only one QE may be assumed per beacon), so current r-TWT implementations may not scale for enterprise and/or Internet of Things (IoT) devices. The beacon interval (e.g., Target Beacon Transmission Time (TBTT)) may also be too large (e.g., 100 milliseconds) for enterprise and/or IoT devices. For example, there may thousands of sensors measuring simultaneously, and there would not be enough time to reserve a r-TWT period for each device. Therefore, methods for Basic Service Set (BSS) resource reservations are provided to address and avoid the limitations of r-TWT and QE.

FIG. 1 is a block diagram of an operating environment 100 for BSS reservations. The operating environment 100 may include a BSS 102 that includes an AP 104, a first STA 110, a second STA 112, a third STA 114, and an additional BSS 120. The BSS 102 may include a different number of STAs in other examples. The additional BSS 120 may include an AP and one or more STAs.

The AP 104 may enable the devices, such as the first STA 110, the second STA 112, and the third STA 114, to connect to a network and communicate with each other with the AP 104 acting as a medium for the communication. To prevent interference, concurrent competing transmissions, and/or the like between the first STA 110, the second STA 112, and the third STA 114, the AP 104 may enable BSS resource reservation. The BSS resource reservation may enable the first STA 110, the second STA 112, and the third STA 114 to reserve periods for TxOps that the AP 104 will reserve for the associated STA. The other STAs that are not associated with a reserved period may not attempt to transmit signals during the reserved period, and the AP 104 may inform the other STAs when the reserved period is scheduled to occur and/or instruct the other STAs not to transmit during the reserved period. The AP 104 may reserve time slots for the STAs based on requests from the first STA 110, the second STA 112, and/or the third STA 114, determining the transmissions the first STA 110, the second STA 112, and/or the third STA 114 may make, and/or the like.

In an approach for BSS resource reservation, the AP 104 may send a reservation scheduling frame (e.g., a Medium Access Control (MAC) Protocol Data Unit (MPDU)) that contains a time window, such as setting a Network Allocation Vector (NAV), that is long enough to accommodate both the AP's 104 transmission of the frame, any Acknowledges (ACKs), and an expected duration of a STA's communication during a reservation period (e.g., the first STA 110, the second STA 112, or the third STA 114), whether the STA's communication is between the STA and the AP 104 or the STA and another STA.

In some examples, the reservation scheduling frame may be a MPDU that contains the time window (e.g., a NAV). An MPDU can include a MAC header, a body that includes the payload, and a trailer. The MAC header may include a duration field that specifies the transmission time of the reservation scheduling frame and the period of the time window for a reservation (e.g., the duration of the NAV). The STAs may reference the duration field to determine the ending time of the reservation scheduling frame and the duration of the time window for a reserved period. The AP 104 may generate an Aggregate MPDU (A-MPDU), aggregating multiple frames into a single transmission, pass the A-MPDU to the Physical (PHY) layer, and transmit the A-MPDU with a PHY header. The AP 104 may send an A-MPDU to efficiently fill time slots with data (i.e., filling the time slot with multiple frames in a single transmission). Thus, the AP 104 may assign multiple reservation periods with a single A-MPDU transmission.

The first STA 110, the second STA 112, and/or the third STA 114 can reply to MPDUs, such as an A-MPDU, with a block ACK. Thus, the STAs may, instead of transmitting an individual ACK for every MPDU (i.e., frame), acknowledge multiple MPDUs together using a single block ACK frame. The AP 104 may not require block ACKs in some examples and may transmit frames without waiting to receive any ACK frames.

The AP 104 may transmit the reservation scheduling frame to claim channel access, inform the STAs when a time window of a reservation period is scheduled to occur, and reserve the channel for a duration as defined by the determined time window (e.g., as defined by the period of the NAV). Thus, the AP 104 may determine the length of the period for the reservation to prevent wasting bandwidth, by adjusting the period of the time window for example. A NAV may be a virtual carrier sensing mechanism that may act as a counter that counts down to zero. When the NAV has a non-zero value, the channel is considered busy. When the NAV has a value of zero, the channel is considered free and STAs may contend for TxOps on the channel. The AP 104 may therefore adjust the length of the time window by adjusting the starting value of the NAV.

The AP 104 may transmit the reservation scheduling frame at the start of a gate (e.g., as described by IEEE 802.1Qbv) or at a desired scheduled time. The AP 104 may open the gate and reserve one or more reservation periods for one or more STAs by transmitting the reservation scheduling frame. During a reservation period (e.g., as defined by the NAV in the reservation scheduling frame), all STAs that are not assigned the reservation in the BSS 102 may not transmit, and the target STA will be enabled (e.g., based on the target STA's gate time, as described by IEEE 802.1Qbv) to transmit immediately after the end of the AP's 104 transmission, during the time window defined by the transmission, thereby allowing the target STA to transmit without contending with other transmissions. For example, the AP 104 may transmit a reservation scheduling frame to assign the first STA 110 a reservation period. Once the AP 104 transmission concludes, the first STA 110 may transmit during the time window reserved by the reservation scheduling frame, and the second STA 112 and the third STA 114 may not transmit during the time window.

The AP 104 may also prevent STAs of other BSSs, such as the additional BSS 120, from transmitting during a reservation period. For example, the AP 104 may set an inter-BSS NAV (e.g., a NAV for the BSS 102, the additional BSS 120, and/or other BSSs) to match the intra-BSS NAV (e.g., the NAV of the BSS 102) to prevent the STAs of the additional BSS 120 and/or other BSSs operating on the same channel as the target STA from transmitting during the target STA's reservation period. Thus, the AP 104 may reserve a period for a target STA to transmit across multiple BSSs.

The AP 104 may use TSN gate knowledge to secretly (e.g., without notifying other STAs) reserve the time windows for STA TxOps. In some examples, the AP 104 may not send the reservation scheduling frame to the target STA, and the target STA may be aware that the it can transmit after the end of the reservation scheduling frame without adhering to channel access methods (e.g., the Point Coordination Function (PCF), Enhanced Distributed Channel Access (EDCA), Short Interframe Space (SIFS), Arbitration Interframe Spacing (AIFSN), Rule Based Order (RBO), etc.), because the target STA may know which reservation period it is assigned via the TSN gate schedule.

In some embodiments, the AP 104 may also perform a lock-out of the EDCA function (e.g., Traffic Identifier (TID) queues) before sending a reservation scheduling frame (e.g., in advance of opening a TSN gate). The AP 104 may perform the lock-out of the EDCA function to ensure the AP 104 is not processing other traffic or different queues and there is no in process frame being transmitted at the time the TSN gate opens, because the processing and/or in process frame may interfere or block the reservation scheduling frame and/or interfere with a time window the AP 104 wants to reserve. The lock-out may cause the processing and/or in process frame transmission to stop or be preempted by the reservation scheduling frame and the associated time window(s). The AP 104 may utilize a TSN guard band (GB) or Guard Time (GT) as a determinant of when a last frame should be allowed to be sent for transmission at the lower hardware layers, such as in a Single-User (SU) mode. The AP 104 may also determine when a last frame may be sent based on frame size, channel access parameters (e.g., AIFSN, SIFS, BO, retries, etc.), and/or the like. Lock-out of the EDCA queue in the SU-mode may include the AP 104 prohibiting any frame in the TID queue from being sent to a lower hardware queue if the frame's potential end time could overlap with the GT of the TSN gate the AP 104 plans to transmit a reservation scheduling frame.

The AP 104 may also utilize a Multi-User (MU) mode, such as MU-Orthogonal Frequency-Division Multiple Access (OFDMA) of Multi-Input Multi-Output (MIMO), to set a virtual EDCA lock-out (e.g. permanent or dynamic Resource Unit (RU) allocation), thereby allowing the AP 104 to determine how to prevent transmissions from interfering with reservation scheduling frames and/or time windows. Utilizing MU modes may be viable in a well-controlled BSS where-by all STAs are under MU-EDCA control by the AP 104. In MU-mode, the lock-out may be virtual in the sense that the AP 104 and/or a scheduler may lock-out or otherwise reserve RUs in an upcoming MU frame to guarantee access of the TSN TID traffic to the lower hardware queues. The AP 104 therefore may not need to reserve the entire channel for a reservation scheduling frame and time window. For example, the AP 104 may simply reserve one or more RUs for the reservation scheduling frame and time window. Thus, even if the AP 104 transmits a MU frame right before the TSN gate time, the MU frame may accommodate the reservation scheduling frame and not block its transmission.

In other embodiments, the AP 104 may pre-poll any non-TSN STAs to minimize Uplink (UL) contention (e.g., prevent STAs from transmitting) when sending a reservation scheduling frame (e.g., at TSN gate opening) and time window. The AP 104 may minimize UL contention based on the expected UL traffic flow (e.g., based on TSN, Aggregation Services Router (ASR) period, router queue depth from Buffer Status Report Poll (BSRP), router Head of Line (HOL) Delay, expected MU-EDCA timer expiry, etc.). Because the STAs may be capable of Trigger Based (TB)-UL-OFDMA and may be incentivized to opt-in for faster service, the AP 104 may use the expected service time/rate and prior queue depth from polls (e.g., BSRP, HOL delay) to issue a series of polls (e.g., BSRP) followed by UL service (e.g., TB-UL-OFDMA) sequences. In other examples, the AP 104 may just proceed with UL service without issuing polls when flows are known for all STAs not supporting TSN flows. The AP 104 and/or a scheduler may perform a simple computation ensure the pre-polling sequences end before the TSN gate begins. Pre-polling may minimize or eliminate the possibility of a STA starting a TXOP in Random Access (RA) or SU mode during the TSN gate duration, which may have interfered with a reservation scheduling frame and/or time window.

Thus, one or more STAs may be polled before an upcoming reservation scheduling frame. If enough time remains to service one or more of the polled STAs without interfering with the reservation scheduling frame (e.g. based on calculating whether the transmission will end during or after the GT as described above), then the STA(s) may be serviced and the TID queue may be cleared. The STA(s) may then avoid attempting to take a SU TXOP during the reservation scheduling frame and time window. Computation of the polling time for STAs may be based on historical BSRP responses, worst-case transmission times, and/or the like. The AP 104 may attempt to minimize the gap between end of queue service and time the AP 104 transmits the reservation scheduling frame.

In other embodiments, the AP 104 unicast or otherwise transmit a signal, such as a Contention Free (CF)-End signal, to indicate the end of the AP's TXOP (e.g., the reservation scheduling frame and time window), allowing other APs and/or STAs to access the medium. APs, including the AP 104, may coordinate between themselves and share the TSN gate timing. If one AP is designated as serving the TSN flow and another AP has started a TXOP that will overlap the TSN gate, that AP can use a CF-End to signal to all of its associated STAs that the TXOP is over and to await the next scheduling event.

Figure 2:
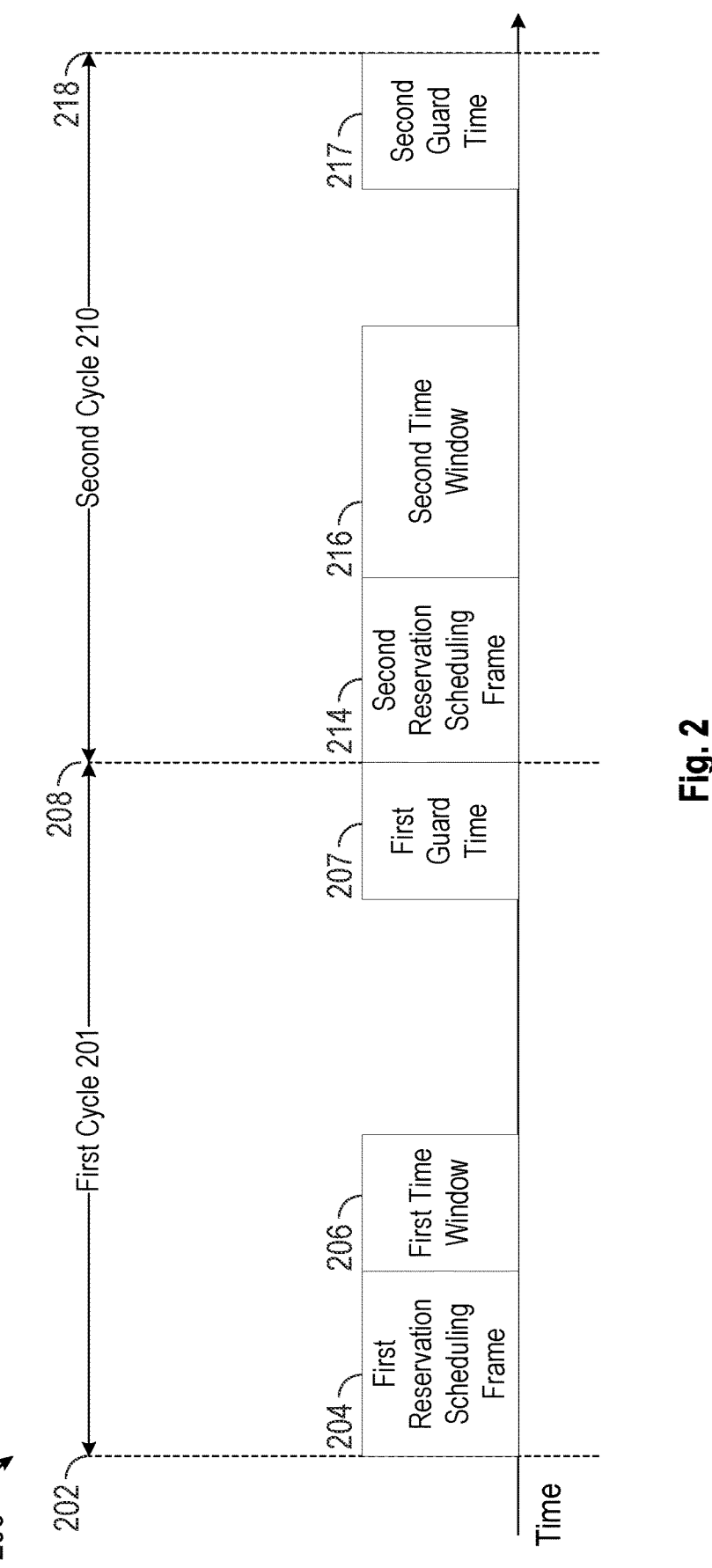
FIG. 2 is a block diagram of an approach for BBS reservations.

FIG. 2 is a block diagram of an approach for BBS reservations 200. The approach for BBS reservations 200 may include the process described above, including the AP 104 transmitting a reservation scheduling frame that sets a time window for a target STA (e.g., the first STA 110, the second STA 112, or the third STA 114) to transmit during a reserved period.

The approach for BBS reservations 200 may include a first cycle 201. The first cycle 201 may begin at first time 202. The first time 202 may be the start of a gate or at a desired scheduled time. At the first time 202, the AP 104 may transmit a first reservation scheduling frame 204. The first reservation scheduling frame 204 may be a MPDU that includes a duration field indicating the transmission time of the first reservation scheduling frame 204 and the duration of a first time window 206 (e.g., by indicating a NAV duration). The first time window 206 may be a period a target STA can transmit without contending with transmissions from other STAs. After the first time window 206, any STA may transmit for the rest of the first cycle 201. The first cycle 201 may end at second time 208.

The second time 208 may be the start time of a second cycle 210. The second time 208 may be the start of another gate or another desired scheduled time. At the second time 208, the AP 104 may transmit a second reservation scheduling frame 214. The second reservation scheduling frame 214 may be a MPDU that includes a duration field indicating the transmission time of the second reservation scheduling frame 214 and the duration of a second time window 216 (e.g., by indicating a NAV duration). The second time window 216 may be a period a target STA, whether the same target STA in the first cycle 201 or a new STA, can transmit without contending with transmissions from other STAs. After the second time window 216, any STA may transmit for the rest of the second cycle 210. The second cycle 210 may end at third time 218.

The first cycle 201 may also include a first guard time 207, and the second cycle 210 may include a second guard time 217. In some examples, the AP 104 may use the first guard time 207 and the second guard time 217 to determine when transmissions should stop and/or lock-out the EDCA function to prevent interference with subsequent reservation scheduling frames and/or time windows. For example, the AP 104 may use the first guard time 207 to determine when to stop transmissions and/or lock-out the EDCA function to prevent interference during the transmission of the second reservation scheduling frame 214 and/or the second time window 216. In other examples, the AP 104 may utilize a MU mode to perform a virtual lock-out as described above.

Figure 3:
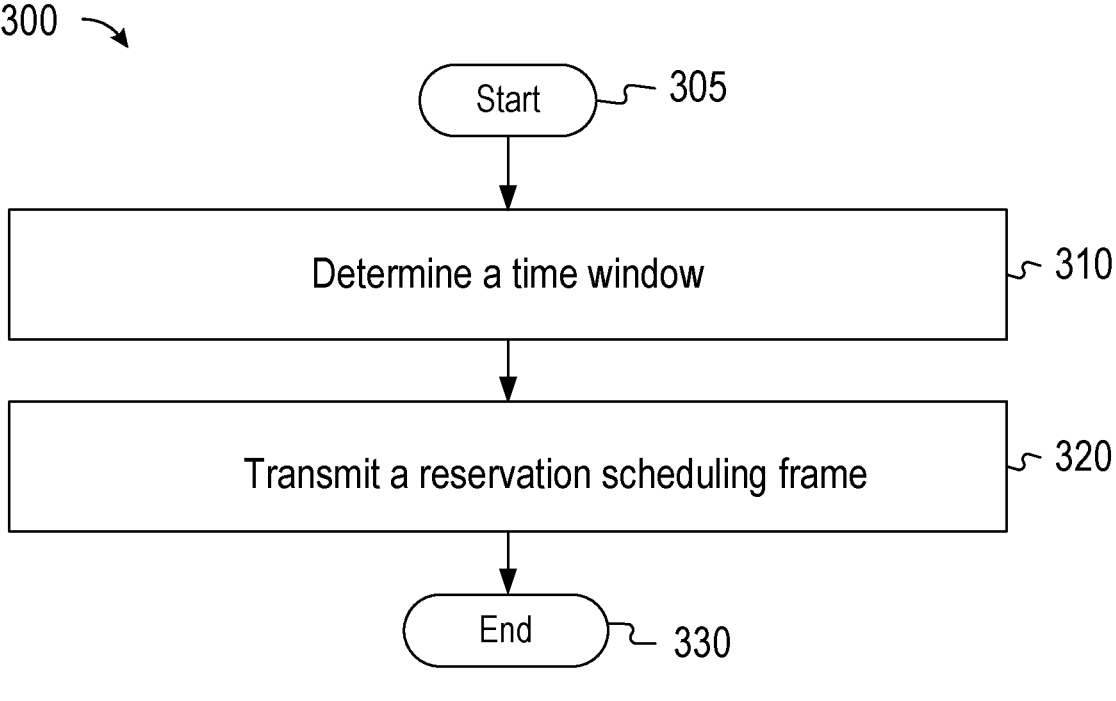
FIG. 3 is a flow chart of a method for BSS reservation.

FIG. 3 is a flow chart of a method 300 for BSS reservation. The method 300 may begin at starting block 305 and proceed to operation 310. In operation 310, a time window may be determined. For example, the AP 104 may determine a time window long enough for a target STA (e.g., the first STA 110, the second STA 112, or the third STA 114).

In operation 320, a reservation scheduling frame may be transmitted. For example, the AP 104 may transmit the reservation scheduling frame to claim access of a channel, inform the target STA of the time window, and reserve the channel for a duration defined by the time window. The reservation scheduling frame may be a MPDU that includes data for setting NAV to the duration of the time window determined in operation 310. The method 300 may conclude at ending block 330. The method 300 may additionally include the various processes described above, including, setting an inter-BSS NAV, locking-out the EDCA function, virtually locking-out the EDCA function, pre-polling, etc.

Figure 4:
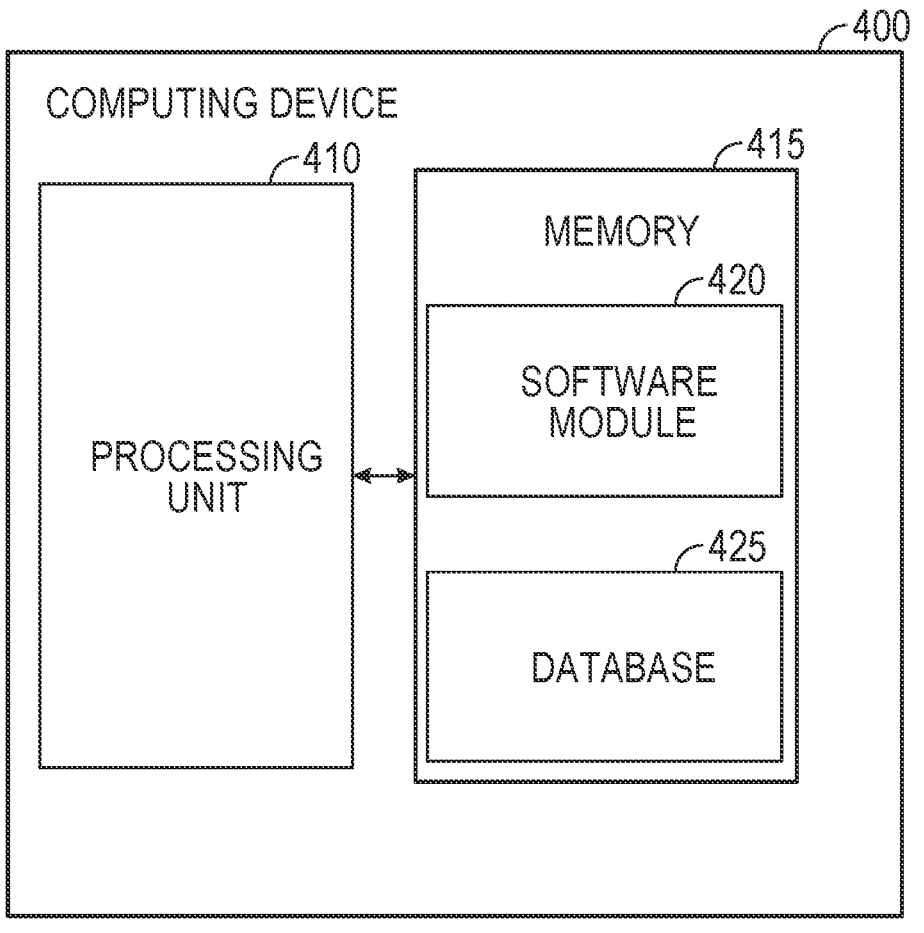
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for BSS resource reservation with respect to FIG. 1, FIG. 2, and FIG. 3. Computing device 400, for example, may provide an operating environment for the AP 104, the first STA 110, the second STA 112, the third STA 114, and the like. The AP 104, the first STA 110, the second STA 112, the third STA 114, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:
1. A method comprising:
determining a time window for an Access Point (AP) to accommodate a transmission of a target Station (STA) in a Basic Service Set (BSS), wherein the BSS further comprises one or more other STAs;
transmitting a reservation scheduling frame, to:

claim access of a channel, inform the target STA of the time window, and reserve the channel for a duration defined by the time window, wherein the reservation scheduling frame is a Medium Access Control (MAC) Protocol Data Unit (MPDU), wherein the MPDU comprises a header including a duration field that indicates a transmission time of the reservation scheduling frame and the duration defined by the time window; and instructing each of the one or more other STAs of the BSS not to transmit during the time window.

2. The method of claim 1, wherein the reservation scheduling frame comprises a value setting a Network Allocation Vector (NAV), wherein the NAV indicates the duration defined by the time window.

3. The method of claim 1, wherein the MPDU comprises:

a body; and a trailer.

4. The method of claim 1, wherein the reservation scheduling frame is included in an Aggregate-MPDU (A-MPDU).

5. The method of claim 1, further comprising:

setting an inter-BSS NAV to indicate the reservation of the channel for the duration.

6. The method of claim 1, further comprising:

locking-out an Enhanced Distributed Channel Access (EDCA) function before transmitting the reservation scheduling frame.

7. The method of claim 1, further comprising:

pre-polling at least a portion of the one or more other STAs to minimize Uplink (UL) contention.

8. A system comprising:

a memory storage; and a processing unit coupled to the memory storage, wherein the processing unit is operative to:

determine a time window for an Access Point (AP) to accommodate a transmission of a target Station (STA) in a Basic Service Set (BSS), wherein the BSS further comprises one or more other STAs; and transmit a reservation scheduling frame, to:

claim access of a channel, inform the target STA of the time window, and reserve the channel for a duration defined by the time window, wherein the reservation scheduling frame is a Medium Access Control (MAC) Protocol Data Unit (MPDU), wherein the MPDU comprises a header including a duration field that indicates a transmission time of the reservation scheduling frame and the duration defined by the time window; and instruct each of the one or more other STAs of the BSS not to transmit during the time window.

9. The system of claim 8, wherein the reservation scheduling frame comprises a value setting a Network Allocation Vector (NAV), wherein the NAV indicates the duration defined by the time window.

10. The system of claim 8, wherein the MPDU further comprises:

a body; and a trailer.

11. The system of claim 8, wherein the reservation scheduling frame is included in an Aggregate-MPDU (A-MPDU).

12. The system of claim 8, wherein the processing unit is further operative to:

set an inter-BSS NAV to indicate the reservation of the channel for the duration.

13. The system of claim 8, wherein the processing unit is further operative to:

lock-out an Enhanced Distributed Channel Access (EDCA) function before transmitting the reservation scheduling frame.

14. The system of claim 8, wherein the processing unit is further operative to:

pre-poll at least a portion of the one or more other STAs to minimize Uplink (UL) contention.

15. A non-transitory computer-readable medium that stores a set of instructions which when executed perform a method executed by the set of instructions comprising:

determining a time window for an Access Point (AP) to accommodate a transmission of a target Station (STA) in a Basic Service Set (BSS), wherein the BSS further comprises one or more other STAs; and transmitting a reservation scheduling frame, to:

claim access of a channel, inform the target STA of the time window, and reserve the channel for a duration defined by the time window, wherein the reservation scheduling frame is a Medium Access Control (MAC) Protocol Data Unit (MPDU), wherein the MPDU comprises a header including a duration field that indicates a transmission time of the reservation scheduling frame and the duration defined by the time window; and instructing each of the one or more other STAs of the BSS not to transmit during the time window.

16. The non-transitory computer-readable medium of claim 15, wherein the reservation scheduling frame comprises a value setting a Network Allocation Vector (NAV), wherein the NAV indicates the duration defined by the time window.

17. The non-transitory computer-readable medium of claim 15, wherein the MPDU further comprises:

a body; and a trailer.

18. The non-transitory computer-readable medium of claim 15, wherein the reservation scheduling frame is included in an Aggregate-MPDU (A-MPDU).

19. The non-transitory computer-readable medium of claim 15, wherein the method executed by the set of instructions further comprises:

setting an inter-BSS NAV to indicate the reservation of the channel for the duration.

20. The non-transitory computer-readable medium of claim 15, wherein the method executed by the set of instructions further comprises:

locking-out an Enhanced Distributed Channel Access (EDCA) function before transmitting the reservation scheduling frame.

* * * * *